(12) United States Patent
Schwarz

(10) Patent No.: US 12,338,739 B2
(45) Date of Patent: Jun. 24, 2025

(54) SYSTEM HAVING A LIQUID AIR ENERGY STORAGE AND POWER PLANT APPARATUS

(71) Applicant: Helmut Schwarz, Kleindingharting (DE)

(72) Inventor: Anton Schwarz, Passau (DE)

( * ) Notice: Subject to any disclaimer, the term of this patent is extended or adjusted under 35 U.S.C. 154(b) by 86 days.

(21) Appl. No.: 17/920,366

(22) PCT Filed: Apr. 15, 2021

(86) PCT No.: PCT/EP2021/059819
§ 371 (c)(1),
(2) Date: Oct. 20, 2022

(87) PCT Pub. No.: WO2021/213893
PCT Pub. Date: Oct. 28, 2021

(65) Prior Publication Data
US 2023/0243271 A1     Aug. 3, 2023

(30) Foreign Application Priority Data

Apr. 21, 2020   (DE) ..................... 10 2020 110 854.0

(51) Int. Cl.
| | |
|---|---|
| *F01D 15/10* | (2006.01) |
| *C25B 1/04* | (2021.01) |
| *C25B 9/23* | (2021.01) |
| *C25B 9/67* | (2021.01) |
| *F01K 13/00* | (2006.01) |
| *F25J 1/00* | (2006.01) |

(52) U.S. Cl.
CPC ............. *F01D 15/10* (2013.01); *C25B 1/04* (2013.01); *C25B 9/23* (2021.01); *C25B 9/67* (2021.01); *F01K 13/00* (2013.01); *F25J 1/0012* (2013.01)

(58) Field of Classification Search
CPC .. F01D 15/10; C25B 9/67; C25B 9/23; C25B 1/04; F01K 13/00; F25J 1/0012

USPC .......................................................... 60/659
See application file for complete search history.

(56) References Cited

U.S. PATENT DOCUMENTS

| | | | |
|---|---|---|---|
| 4,353,214 A | 10/1982 | Gardner | |
| 2012/0238645 A1 | 9/2012 | Rudlinger | |
| 2012/0263605 A1* | 10/2012 | DeMore | .................. F04D 17/12 |
| | | | 417/2 |

(Continued)

FOREIGN PATENT DOCUMENTS

| | | | | |
|---|---|---|---|---|
| CA | 2780856 A1 * | 5/2011 | ........... | C07C 29/151 |
| DE | 10 2010 060 595 | 5/2012 | | |
| DE | 102010060595 A1 * | 5/2012 | ................ | F02C 6/16 |

(Continued)

*Primary Examiner* — Mark A Laurenzi
*Assistant Examiner* — Kelsey L Stanek
(74) *Attorney, Agent, or Firm* — Frijouf, Rust & Pyle, P.A.

(57) ABSTRACT

The invention relates to a system (10) having a liquid air energy storage and power plant apparatus (12), having a charging component (16) comprising a compressor (26) for compressing supplied air and comprising a liquefier (40) which adjoins said compressor and which serves for liquefying the air. According to the invention, an apparatus (14) for permanent water electrolysis having at least one first heat exchanger (94, 96) is provided, by means of which the heat energy generated during the electrolysis is absorbed by a fluid flowing through the first heat exchanger (94, 96).

22 Claims, 3 Drawing Sheets

(56) References Cited

U.S. PATENT DOCUMENTS

2015/0300209 A1\* 10/2015 Goldman .................. F01K 3/08
                                                        60/659
2019/0352887 A1\* 11/2019 Hanebuth ................ B01D 1/16

FOREIGN PATENT DOCUMENTS

| DE | 102014105237 | 4/2015 |
| DE | 102015109898 | 8/2016 |
| WO | WO 2019/207564 | 10/2019 |

\* cited by examiner

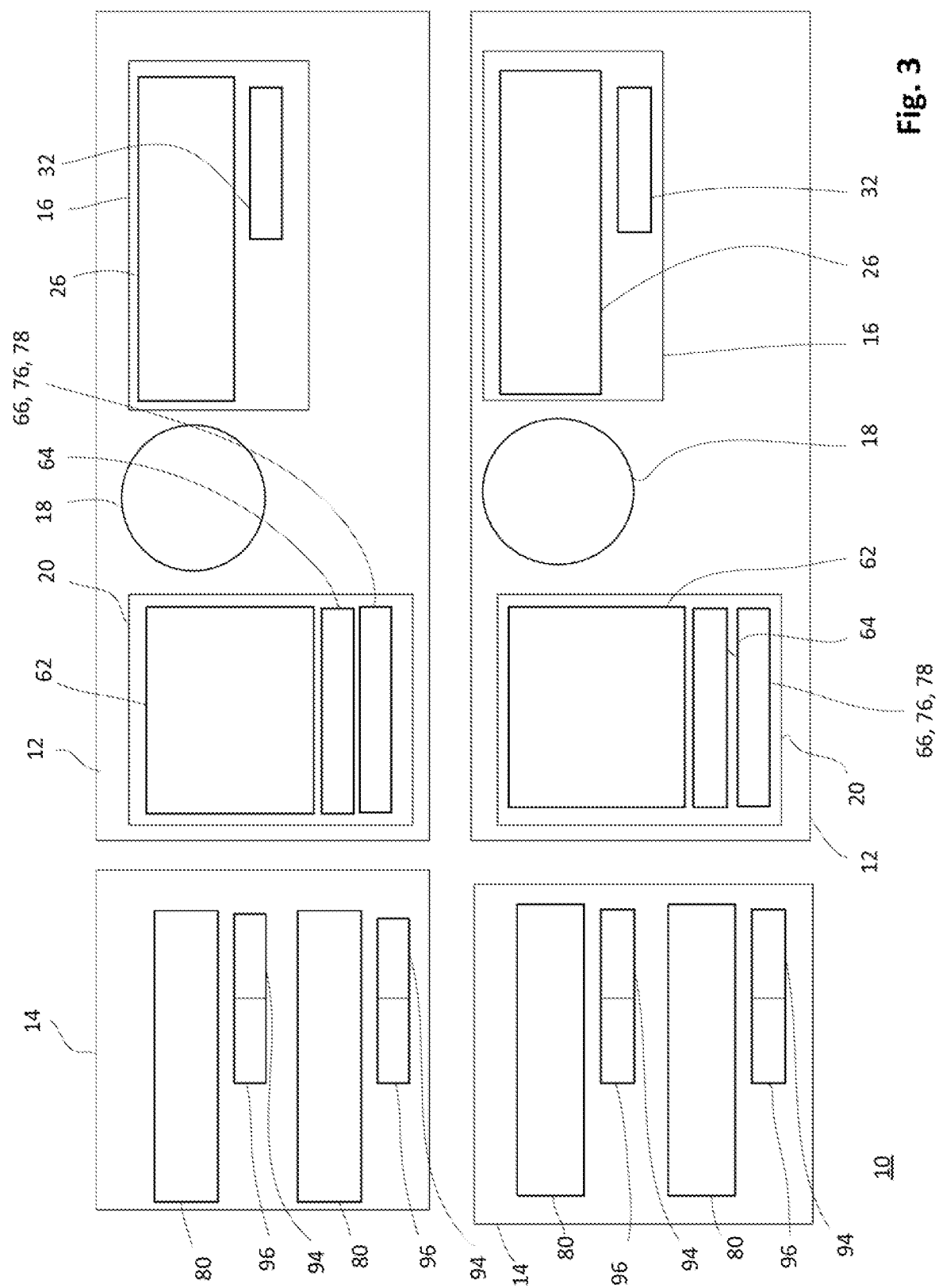

SYSTEM HAVING A LIQUID AIR ENERGY STORAGE AND POWER PLANT APPARATUS

This patent application is the national phase entry of PCT/EP2021/059819, international application filing date Apr. 15, 2021, which claims the benefit and priority of and to German patent application no. 2020110 854.0, filed Apr. 21, 2020.

PCT/EP2021/059819, international application filing date Apr. 15, 2021 and German patent application no. 10 2020 110 854.0, filed Apr. 21, 2021 are incorporated herein by reference hereto in their entireties.

BACKGROUND OF THE INVENTION

The invention relates to a system having a liquid air energy storage and power plant apparatus and to a method for operating such a system.

In many countries, in electricity generation, the share of electricity produced from solar and wind power is steadily increasing. For this reason, the storage of electrical energy is becoming more and more important. This is because, while hydroelectric power plants in conjunction with dams can be used to generate electrical energy largely in line with demand, and large-scale power plants such as gas, coal or nuclear power plants can at least generate constant output, wind or solar power plants will generate electrical power completely independently of electricity demand only when there is wind or sunshine. Regularly, solar power is even generated inversely to power demand. Currently, for example, huge amounts of wind power are being produced in Lower Saxony to no avail because the grid cannot absorb these amounts of electricity. In Europe in 2019, wind energy temporarily reached the output of 100 nuclear power plants.

The storage of electricity in liquid air energy storage systems. i.e. what is called the LAES technology (Liquid Air Energy Storage, LAES in short), therefore plays a decisive role in such an energy system. The great advantage of liquid air energy storage systems compared to pumped storage systems is that they can be installed precisely where needed, almost regardless of local conditions. Thus, no special geological conditions and work are required. Moreover, the construction period for a pumped storage power plant of a capacity of 2×150 MW is 10 years. In contrast, systems having a liquid air energy storage and power plant apparatus are ready for operation after a maximum design and construction period of 18 months.

In the known liquid air energy storage and power plant apparatus, ambient air is liquefied with the aid of electricity using the Linde process, stored in cryogenic (supercold) storage tanks and, if required, converted back into electricity in an expansion turbine, and fed into an electricity grid.

A liquid air energy storage and power plant apparatus essentially comprises three main components: a charging component, a storage component, and a discharging component. The charging component is in operation when energy is to be stored from electricity that is not needed, i.e. at midday for example when the sun is shining. Using the electricity provided, ambient air is compressed in the charging component with the aid of a compressor and liquefied by expansion to −190° C. in a manner known per se using the Linde process, or with the aid of an expansion turbine and brake generator. Subsequently, the liquid air is stored at near ambient pressure in an insulated storage tank—storage component—at a density of more than 700 times that of ambient air. When more power is needed again, the liquid air is pressurized by means of a pump, heated in an evaporator, vaporized, and finally expanded to ambient pressure in the discharging component via a turbine connected to a generator or plural turbines connected to generators. Via the generator, electricity is again fed into a power grid. Performance of the liquid air energy storage and power plant apparatus can be increased by coupling external thermal energy into the evaporation device as the liquid air is converted into compressed air.

It is known from DE 10 2015 109 898 A1 to integrate the liquid air energy storage and power plant apparatus into a system with a steam power plant in order to use the waste heat, i.e. the thermal energy, for increasing the effectiveness of the discharging component and thus of the liquid air energy storage and power plant apparatus as a whole.

However, steam power plants are relatively costly and subject to strict environmental regulations. This is why they can only be built at selected locations. In most cases, the locations of steam power plants are not close to wind turbines or solar power plants. Moreover, the steam power plant disclosed in DE 10 2015 109 898 A1 includes a boiler fueled by fossil fuel gas, in which safety-related material problems may occur as a result of the alternation of very high and low temperatures. It should also be noted that high-alloy steels are not designed to withstand temperatures around −190° C. for air liquefaction. Furthermore, the efficiency of such a system is insufficient, as is its carbon footprint.

SUMMARY OF THE INVENTION

For this reason, it is the object of the invention to improve on the system in such a way that, while avoiding the aforementioned disadvantages, for one thing, energy can be stored and extracted again in a relatively inexpensive way and, furthermore, external energy from an energy-intensive process is used for the production of other green products.

This object is accomplished by the characterizing features of claim 1 in conjunction with the features of its preamble.

The dependent claims relate to advantageous further embodiments of the invention.

The invention is based on the insight that a continuous electrolysis process for the production of hydrogen and oxygen continuously generates waste heat in a temperature range between about 40° C. and 90° C. and thus generates heat energy which corresponds to the required amount of heat that is optimal for the process for vaporizing liquid air to compressed air. Consequently, integrating such an electrolysis process into the system having a liquid air energy storage and power plant apparatus will allow its overall efficiency to be significantly increased. It should also be noted that in the medium term, hydrogen and also oxygen will become the central building blocks of a secure, sustainable and economical energy supply based on renewable energies. The integration of power-to-hydrogen systems will reduce the costs of the energy transition while increasing security of supply. In addition, the demand for hydrogen is substantial and increasing for a wide variety of applications, including the rising sales of hydrogen-powered vehicles, which require about 5 kg of hydrogen for every 500 km traveled. Currently, 600 billion Nm3 of hydrogen are consumed annually in refineries and petrochemical plants, 40 billion Nm3 of which in Germany alone.

According to the invention, therefore, the system is provided with a device for permanent water electrolysis having at least one first heat exchanger through which thermal energy generated during electrolysis is absorbed by a fluid flowing through said first heat exchanger. At least one first heat line is provided which supplies the evaporation device with thermal energy via the fluid. The first heat exchanger is connected to the first heat line in such a way that the heat energy generated during electrolysis is dissipated through the first heat exchanger via the fluid as well as supplied to the evaporation device. This is a simple way of feeding the heat energy generated in permanent electrolysis, i.e. H2 and O2 production, to the evaporation device of the liquid air energy storage and power plant apparatus and regulating it.

In one embodiment of the invention, the evaporation device is designed as a water bath evaporation device. Such a water bath evaporation device is ultimately a heat exchanger through which the first heat line passes and delivers the heat energy via a water bath at least to a line carrying the liquefied air. This process is used to convert the liquefied air into gaseous compressed air. A water bath evaporation device is characterized by its robust and reliable design and has a wide capacity range.

Such water bath evaporation devices are basically known and used in cryogenic plants to evaporate liquefied gases such as air, oxygen, nitrogen, argon and natural gas. This is performed in a load range of approx. 500 to 195,000 Nm3/h. Up to three different liquid gas streams can be processed in a water bath evaporation device.

Preferably, two first heat exchangers are provided, with one first heat exchanger being used for oxygen recovery and another first heat exchanger being used for hydrogen recovery in the water electrolysis device in order to absorb the heat energy generated during electrolysis via the fluid flowing through the first two heat exchangers. Via the first two heat exchangers, almost all of the waste heat from the permanent electrolysis device is to be transferred to the fluid and, via the latter, ultimately to the evaporation device.

In another embodiment of the invention, the water electrolysis device for splitting water into hydrogen and oxygen using electric current operates on the principle of proton exchange membrane electrolysis (Proton Exchange Membrane or Polymer Electrolyte Membrane, PEM in short) and is designed for this purpose. The two half-cells are separated from one another by a gas-tight membrane. The major benefit of this technology is its good load change behavior. Compared to other methods, fluctuating electricity quantities can be dealt with more quickly here. In addition, operation in the partial load range is possible over the entire bandwidth.

As an alternative, the permanent electrolysis device for H2 and O2 production can operate on the principle of alkaline electrolysis and be designed for this purpose. In alkaline electrolysis (AEL), metal electrodes are immersed in an alkaline aqueous solution. The half-cells in which the electrodes are suspended are separated by a permeable membrane. When a voltage is applied, oxygen is produced at the anode and hydrogen at the cathode. This technology is characterized by high long-term stability and low investment costs. Moreover, no rare precious metals are needed for the electrode material. Despite their simple design, these types of systems currently achieve the highest efficiencies. However, particularly with regard to the use of volatile electricity supplies, there is the problem of sluggish load change and a relatively low partial-load range.

In order to increase the efficiency of the system further, the compressor of the charging component of the liquid air energy storage and power plant apparatus interacts with at least one second heat exchanger, with the compressor fluid flowing through said second heat exchanger absorbing the heat generated during compression of the air and dissipating it in the direction of the evaporation device.

For this purpose, the second heat exchanger can be connected to the evaporation device via a second heat line in order to feed the heat energy generated during compression to the evaporation device.

In another further embodiment of the invention, at least one third heat exchanger is connected downstream of the evaporation device, which is used to further supply heat energy to the compressed air from the evaporation device and to set the required temperature of the compressed air.

The evaporation device can be connected to the third heat exchanger via the first heat line and/or the second heat line and use the remaining heat energy of the fluid exiting the evaporation device to set the temperature of the compressed air via the third heat exchanger.

Preferably, the third heat exchanger is designed as an air-water heat exchanger. More specifically, the third heat exchanger is connected to the first heat exchanger via the first heat line and forms a first fluid circuit.

As an alterative or in addition, the third heat exchanger may be connected to the second heat exchanger via the second heat line and thus form a second fluid circuit. This also makes use of the thermal energy available in the liquid air energy storage and power plant apparatus so as to increase the efficiency of the overall system.

The third heat exchanger is preferably used to heat the compressed air to ambient temperature, but also to regulate the inlet temperature for the first heat exchanger of the device for permanent H2 and O2 production during electrolysis for optimum operation.

Preferably, the first heat line and/or the second heat line can also have bypasses at the heat exchangers in order to be able to regulate the temperature of the compressed air appropriately. For example, the first heat line has a bypass to the evaporation device in order to be able to also directly supply a higher proportion of heat energy to the third heat exchanger.

The aim of the heat exchanger design is to achieve an effective heat balance in the system. The first heat line, the second heat line and the fluid are thus used to enable a simple transport of heat energy between the Individual components of the system. It is also possible to have multiple evaporation devices, multiple first, second, and third heat exchangers, and heat lines connecting these, and thus multiple fluid circuits. However, desired dimensioning and optimization of the system is the subject matter of the invention.

In order for the process of heat supply, and thus the evaporation of liquid air into compressed air, to take place continuously, a compressed air buffer tank is installed in the discharging component of the liquid air energy storage and power plant apparatus.

The above object is also accomplished by a method for operating a system comprising a liquid air energy storage and power plant apparatus and a device for a permanently operating electrolysis plant. The method is preferably applicable to the system just described. According to the method, the thermal energy of the waste heat of the device for permanent electrolysis is used to supply it to an evaporation device of a discharging component of the liquid air energy storage and power plant apparatus for the conversion of liquefied air into gaseous compressed air and electrical energy.

Preferably, the thermal energy of the waste heat of an electrolyzer of the device for permanent electrolysis is used for this purpose.

According to an advantageous further development of the invention, the thermal energy of a compressor can additionally be used for compressing supplied air of a charging component of the liquid air energy storage and power plant apparatus in order to supply it to the evaporation apparatus of the discharging component of the liquid air energy storage and power plant apparatus for the conversion of liquefied air into gaseous compressed air.

According to yet another embodiment of the invention, the thermal energy is supplied to the evaporation device of the discharging component of the liquid air energy storage and power plant apparatus via a fluid, in particular in connection with a first heat exchanger which is connected to a heat line that supplies and discharges the fluid. The fluid can be fed to the evaporation device at a temperature of between 40° C. and 90° C.

Preferably, the thermal energy is permanently supplied to the evaporation device of the discharging component, and in the evaporation device liquefied air is continuously converted into gaseous air and supplied to a compressed air buffer storage.

In order to compensate in particular for peak loads in the power grid, the gaseous compressed air from the compressed air buffer tank is fed to an expansion device with a turbine and a generator as required. The electricity produced by the generator is fed to an existing power grid for regulation, so as to balance consumption and generation.

Preferably, the fluid from the first heat line may be cooled before entering the first heat exchanger so as to optimize the efficiency of the device for permanent water electrolysis.

Preferably, the fluid in the second heat line can also be cooled before entering the second heat exchanger.

It is considered particularly advantageous to use energy from renewable sources for the liquid air energy storage and power plant apparatus and/or the device for permanent water electrolysis.

The invention is characterized in that owing to the optimized thermal energy transfer between the device for continuous water electrolysis and the discharging component of the liquid air energy storage and power plant apparatus, the efficiency of the system is increased. Thermal energy can be absorbed during continuous 24-hour H2 and O2 production. The liquefaction of the air occurs when there is wind and sunshine. Liquid air evaporation for energy recovery is intended for nighttime and/or peak load periods.

Additional advantages, features and possible applications of the present invention will be apparent from the description which follows, in which reference is made to the embodiments illustrated in the drawings.

Throughout the description, the claims and the drawing, those terms and associated reference signs are used as are listed in the List of Reference Signs below.

BRIEF DESCRIPTION OF THE DRAWINGS

In the drawings,

FIG. 3 is another schematic view of the modular structure of the system according to the invention.

DESCRIPTION OF THE INVENTION

Figure 1:
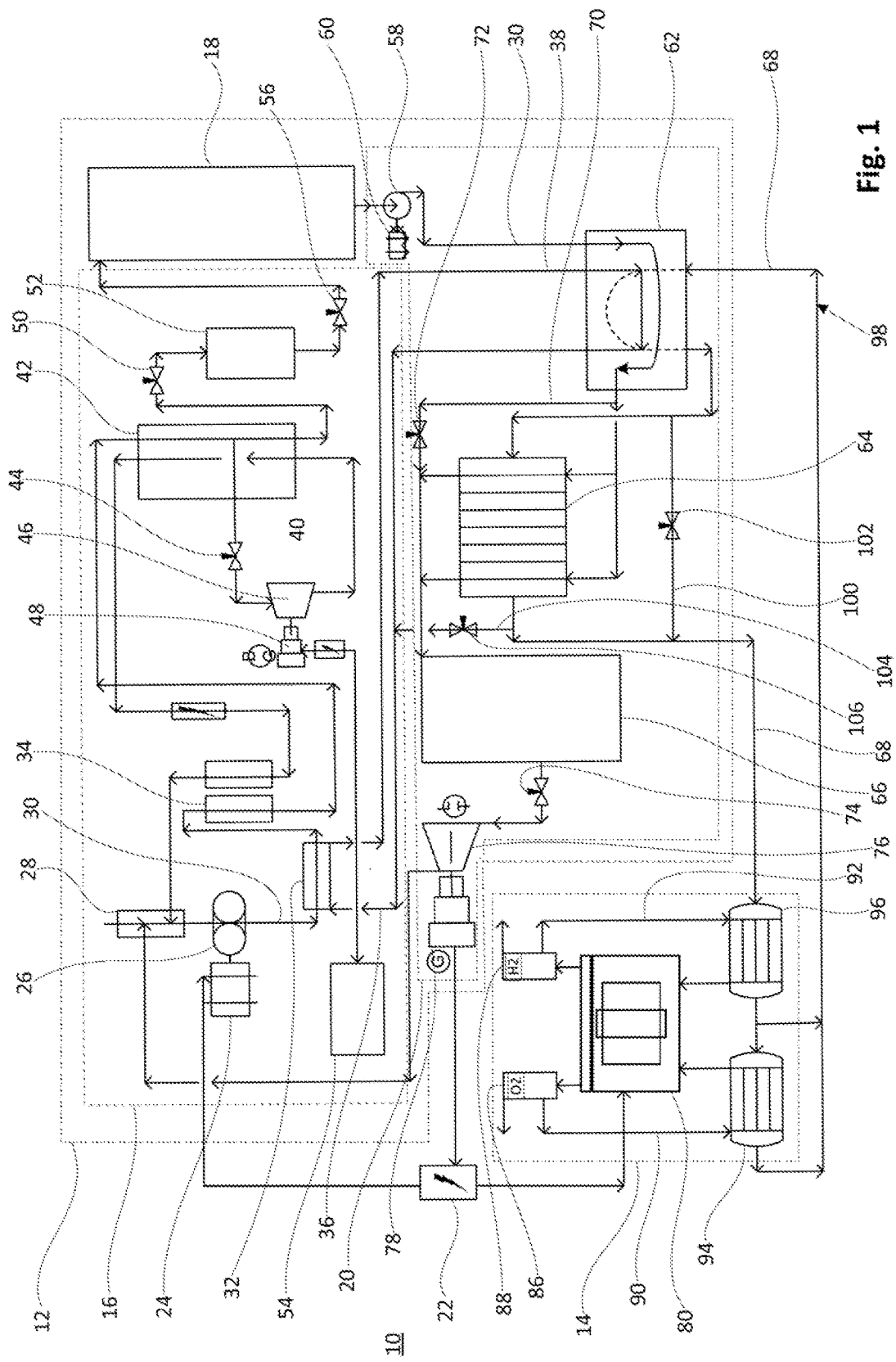
FIG. 1 is a schematic view of a system according to an embodiment of the invention.

Illustrated in FIG. 1 is a system 10 according to an embodiment of the invention. The system 10 comprises a liquid air energy storage and power plant apparatus 12 and an apparatus 14 for permanent water electrolysis.

The liquid air energy storage and power plant apparatus 12 is essentially includes three main components, namely a charging component 16, a storage component in the form of a liquid air storage 18, and a discharging component 20.

Electric power is supplied to an electric motor 24 of the charging component 16 from a power grid 22, which motor 24 is connected to and drives a compressor 26 as needed. An air intake filter 28 is connected upstream of the compressor 26, through which ambient air, among other things, is supplied to the compressor 26 during operation of the charging component 16.

Via an air line 30, the air compressed by the compressor 26 is fed to a dryer 34 via a second heat exchanger 32 of the charging component 16. With the aid of the second heat exchanger 32 of the charging component 16, thermal energy is extracted from the compressed air which is heated by the compression. For this purpose, the second heat exchanger 32 of the charging component 16 is connected to a second heat line 36 of a second fluid circuit 38 for dissipating heat energy. This will be discussed later.

In the dryer 34, the compressed air is cleaned of water vapor, hydrocarbons and carbon dioxide in a manner known per se.

The compressed air is then fed to an air liquefier 40, which includes a heat exchanger 42, a regulating valve 44, an expansion turbine 46 with a brake generator 48 connected thereto to generate electricity, an expansion valve 50, and an expansion tank 52. In the air liquefier 40, the compressed and dried air is first fed to the heat exchanger 42. In the heat exchanger 42, a first partial flow of the compressed air is branched off and directed to the expansion turbine 46 via the regulating valve 44, where the compressed air then expands to ambient pressure and thus drives the expansion turbine 46. The expansion turbine 46 in turn drives the brake generator 48 which generates electricity and transmits it via an electrical control center 54 with inverter, transformer, etc. to the power grid 22 or to the loads of the system 10, for example the compressor 26.

Next, the now strongly cooled air coming from the expansion turbine 46 is fed to the heat exchanger 42 where it extracts a considerable amount of heat energy from the second partial flow, thus cooing it down significantly. The first partial flow thus heated is returned to the air intake filter 28 via the dryer 34 and in this way fed back to the compressor 26.

In the heat exchanger 42, the second partial flow is cooled to just before the liquefaction point and is then passed through an expansion valve 50, where the air then drops to below the liquefaction point and enters the expansion tank 52. Via the expansion tank 52 and another regulating valve 56, liquid air is then introduced into the air storage 18 at ambient pressure and at approximately −190° C. In the air storage 18, the liquid air is stored until energy is required for balancing peak loads.

For extracting energy, liquid air is extracted from the air storage 18 by a pump 58 which is driven by a motor 60. Via air line 30, liquid air is first fed to an evaporation device in the form of a water bath evaporation device 62, and is then fed in the form of compressed air to a third heat exchanger 64, and finally as compressed air to a compressed air buffer tank 66. In the water bath evaporation device 62, heat energy is supplied to the water bath evaporation device 62 via both a first heat line 68 and the second heat line 38, so that liquid air is converted into compressed air and then has a pressure of approx. 40 bar. In the third heat exchanger 64, the compressed air is heated to ambient temperature or warmer and then stored in the compressed air buffer tank 66. The process of extracting liquid air from the air storage 18 and supplying compressed air may be a continuous one.

For easy adjustment of the temperature of the compressed air supplied to the compressed air buffer tank 66, a bypass line 70 is additionally provided, in which a bypass valve 72 is inserted. The bypass fine 70 is connected to the part of the air line 30 that connects the water bath evaporation device 62 to the third heat exchanger 64. In addition, the bypass line 70 is connected to the part of the air line 30 that connects the third heat exchanger 64 to the compressed air buffer tank 66. In this manner, colder compressed air from the water bath evaporation device 62 can be mixed with warmer compressed air from the third heat exchanger 64, thus allowing the temperature of the compressed air that is introduced into the compressed air buffer tank 66 to be adjusted in a predetermined manner.

In the compressed air buffer tank 66, the compressed air supplied via air line 30 is continuously stored until such time when energy is required, for example, for balancing peak loads in the power grid 22. For this purpose, the compressed air buffer tank 66 is connected to a main turbine 76 with an attached power generator 78 via a pneumatic valve 74 and another part of air line 30. In the main turbine 76, the compressed air expands from about 40 bar to ambient pressure, thereby driving the main turbine 76 with the power generator 78 connected thereto to generate electricity. The electricity generated is supplied to the power grid 22 for regulation.

The apparatus 14 for permanent water electrolysis consists of several PEM 80 electrolyzers, which are connected to the power grid 22 from where they receive the electrical energy for permanent water electrolysis for H2 and O2 production. For at least 7,000-8,000 hours a year, the PEM 80 electrolyzers continuously produce hydrogen and oxygen 24 h a day. The oxygen is supplied to an oxygen storage tank 88 and the hydrogen is supplied to a hydrogen storage tank 86 and is further processed or transferred as needed in a manner known per se. The heat energy generated during oxygen production as well as during hydrogen production is dissipated through fluid circuits 90, 92, and is dissipated via a heat exchanger 94 associated with the oxygen production fluid circuit 92, and via a heat exchanger 96 associated with the hydrogen recovery fluid circuit 92.

The first heat line 68 connects the first two heat exchangers 94 and 96 to one another and absorbs the heat energy from the fluid circuits 90 and 92 through the fluid flowing in the heat line 68.

The heat line 68 forms a first fluid circuit 98. More specifically, the heat line 68 runs from the two first heat exchangers 94, 96 to the water bath evaporation device 62 in order to there release the heat energy stored in the fluid of heat line 68 to a water bath, via which the liquefied air of air line 30 is heated again and caused to evaporate.

Heat line 68 continues from the water bath evaporation device 62 to the third heat exchanger 64 and back to the two first heat exchangers 94 and 96. The first fluid circuit 98 formed by the first heat line 68 is thus a closed circuit.

Moreover, a bypass line 100 having a bypass valve 102 of the first fluid circuit 98 is provided, which short-circuits the first heat line 68 while bypassing the third heat exchanger 64. This is a simple way of adjusting the heat energy to be supplied to the compressed air in air line 30 by the fluid in the first heat line 68 via the third heat exchanger 64.

In addition, an equalizing line 104 with an equalizing valve 106 is provided which connects the part of the first heat line 68 downstream of the third heat exchanger 64 to the part of the second heat line upstream of the second heat exchanger 32. This is to transfer fluid from the first heat line 68 of the first fluid circuit 98 to the second heat line 36 of the second fluid circuit 38, thereby introducing heat energy from the first fluid circuit 98 into the second fluid circuit 38. This serves to regulate the return temperature of the second heat line 36 during operation of the charging component 16.

Figure 2:
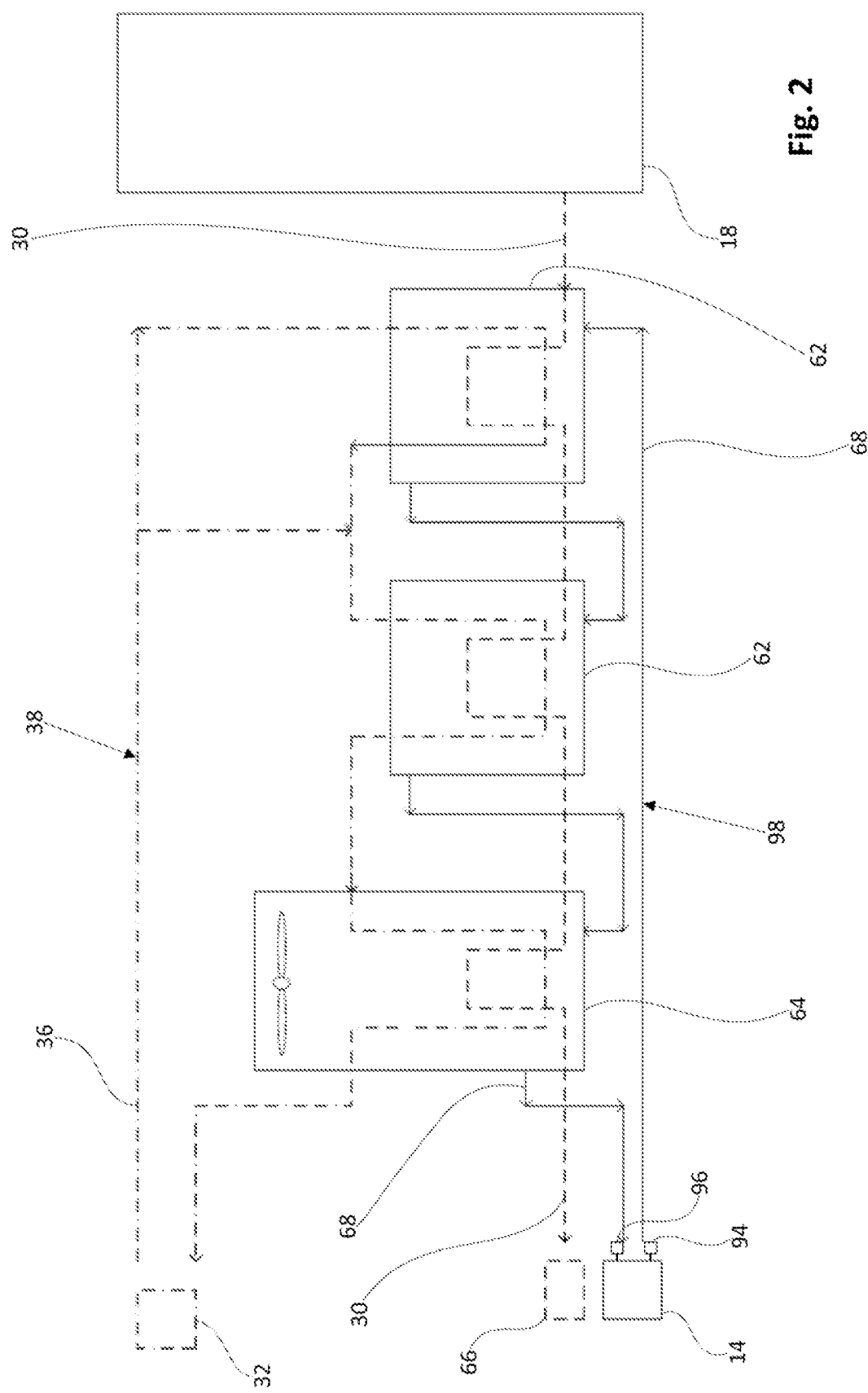
FIG. 2 is another schematic detail view comprising two water bath evaporation devices connected in series and an air/water cooler of a discharging component connected thereto in cooperation with two fluid circuits of the system according to the invention.

FIG. 2 is a schematic view of substantially the first fluid circuit 98 and the second fluid circuit 38. The individual components have the parts of the system 10 as described with reference to FIG. 1. For reasons of clarity, however, these have been omitted from the view of FIG. 2.

The first heat line 68 runs from the first heat exchangers 94, 96 of the apparatus 14 for permanent hydrogen electrolysis to two water bath evaporation devices 62a, 62b connected in series, then on to the third heat exchanger 64 in the form of an air/water cooler, and finally back to the first heat exchangers 94, 96. For reasons of clarity, bypass line 100 with bypass valve 102, but also equalizing line 104 with equalizing valve 106 are not shown here.

The second heat line 36 extends from the second heat exchanger 32 at the compressor 26 to the first water bath evaporation device 62a, subsequently to the second water bath evaporation device 62b, then on to the third heat exchanger 64 and back to the second heat exchanger 32.

Moreover, the air storage 18 is shown with air line 30. Air line 30 runs from the air storage 18 via the two water bath evaporation devices 62a, 62b via the third heat exchanger 64 to the compressed air buffer tank 66.

A fan is provided in the third heat exchanger 64 for cooling the fluid of the first heat line 68 before it enters the first heat exchanger 94, 96, and for cooling the fluid of the second heat line 36 before it enters the second heat exchanger 32.

This clearly shows that the waste heat from the apparatus 14 for permanent hydrogen electrolysis and the waste heat from the compressor 26 are used as thermal energy that is continuously supplied to the discharging component 20 via the water bath evaporation devices 62a, 62b and the third heat exchanger 64 in a 24 hour/7 days a week mode of operation.

FIG. 3 is a schematic view of the basic structure of the system 10 described with reference to FIGS. 1 and 2. As shown, this system 10 has two liquid air energy storage and power plant apparatuses 12 arranged in parallel.

Furthermore illustrated in FIG. 3 are four electrolyzers 80, each having 24 apparatuses 14 for permanent water electrolysis, which are of a modular design and can be expanded as required. These electrolyzers 80 for permanent hydrogen and oxygen production interact with the heat exchangers 94 and 96.

The liquid air energy storage and power plant apparatus 12 includes the charging component 16, the air storage 18, and the discharging component 20 with the water bath evaporation device 62, with the third heat exchanger 64, with the compressed air buffer tank 66, and with the main turbine 76 with the power generator 78. All these components are shown schematically only in order to illustrate the modular design. In addition, the liquid air energy storage and power plant apparatus 12 and the apparatus 14 for permanent hydrogen electrolysis also include all of the features described with reference to FIG. 1.

An electrolyzer 80, which has an energy demand of 17.5 MW, currently produces 8,160 kg of hydrogen a day. In doing so, it transfers 4 MWh of heat via the heat exchangers 94, 96 to the water bath evaporation device 62 via the first fluid circuit 98 via the fluid flowing in the first heat line 68.

The water bath evaporation apparatus 62 includes, for example, 400 m3 of water bath, which requires 18.6 MWh to be heated from 10° C. to 50° C. Via the pump 58 and the associated air-heated water bath evaporation device 62, 40 m3/h of liquid air is introduced into the water bath evaporation device 62, while 28,000 Nm3/h of compressed air is supplied from the water bath evaporation device 62 to the third heat exchanger 64. Here the temperature difference between the liquid air introduced and the discharged compressed air is 100° C. and thus corresponds to an energy input via the water bath evaporation device of approx. 9.5 MWh.

The volume of the liquid air storage 18 is 1,200 m3, for example, which corresponds to approximately 165 MWh of stored energy. Approx. 20 MW of energy is supplied to the compressor 26 by the motor 24 for compressing the intake air. Heat energy is released through the second heat exchanger 32, which heat energy is delivered to the water bath evaporation device 62 through the second fluid circuit 38 via the fluid flowing in the second heat line 36.

During operation of the liquid air energy storage and power plant apparatus 12, the turbine 76 with connected generator 48 can be used to generate energy which is then supplied to the power grid 22.

Because of the diverse portfolio of compressors, gearboxes and generators, the detailed specifications only need to be defined or adapted during the planning phase.

LIST OF REFERENCE SIGNS 10 system
12 liquid air energy storage and power plant apparatus
14 apparatus for permanent water electrolysis
16 charging component
18 liquid air storage
20 discharging component
22 power grid
24 electric motor
26 compressor
28 air intake filter
30 air line
32 second heat exchanger arranged in charging component 16
34 dryer
36 heat line, second heat fine
38 fluid circuit, second fluid circuit
air liquefier
42 heat exchanger
44 regulating valve
46 expansion turbine
48 brake generator
50 expansion valve
52 expansion tank
54 electrical control center
56 additional regulating valve upstream of air storage 18
58 pump
60 motor of pump 58
62 water bath evaporation apparatus
64 third heat exchanger
66 pressurized air buffer tank
68 first heat line
70 bypass line
72 bypass valve
74 pneumatic valve
76 main turbine
78 power generator
80 electrolyzer
86 oxygen storage tank
88 hydrogen storage tank
90 fluid circuit—oxygen
92 fluid circuit—hydrogen
94 heat exchanger—oxygen
96 heat exchanger—hydrogen
98 first fluid circuit
100 bypass line
102 bypass valve
104 equalizing line
106 equalizing valve

The invention claimed is:

1. A system (10), comprising:
a liquid air energy storage and power plant apparatus (12), having a charging component (16) comprising a compressor (26) for compressing supplied air and comprising a liquefier (40), which adjoins said compressor and which serves for liquefying the air, a storage component comprising an air storage (18) for storing the liquefied air, and a discharging component (20) comprising an evaporation apparatus (62) for converting liquid air into gaseous compressed air, wherein heat energy is supplied to the evaporation apparatus (62) via a first heat line (68), and comprising an expansion apparatus which serves for expanding the compressed air and which has a turbine (76) and a generator (78) which is connected to the turbine (76);
an apparatus (14) for permanent water electrolysis having at least one first heat exchanger (94, 96), by means of which the heat energy generated during the electrolysis is absorbed by a fluid flowing through the at least one first heat exchanger (94, 96), which first heat exchanger (94, 96) is connected to the first heat line (68) in such a way that the heat energy generated during the electrolysis is dissipated via the at least one first heat exchanger (94, 96) by means of the fluid and is fed to the evaporation apparatus (62); and
at least one third heat exchanger (64) is connected downstream of the evaporation apparatus (62), which at least one third heat exchanger (64) is used to supply further thermal energy to the compressed air from the evaporation apparatus (62) and to set the required temperature of the compressed air.

2. The system according to claim 1, characterized in that the evaporation apparatus is a water bath evaporation apparatus (62).

3. The system according to claim 1, characterized in that the at least one first heat exchanger comprises two first heat exchangers (94, 96) of which one first heat exchanger (94) is associated with oxygen recovery and the other first heat exchanger (96) is associated with hydrogen recovery in the apparatus (14) for permanent water electrolysis.

4. The system according to claim 1, characterized in that the apparatus (14) for permanent water electrolysis is a proton exchange membrane electrolyzer (Proton Exchange Membrane or Polymer Electrolyte Membrane, or PEM in short).

5. The system according to claim 1, characterized in that the apparatus (14) for permanent water electrolysis is designed as an alkaline electrolyzer.

6. The system according to claim 1, characterized in that the compressor (26) of the charging component (16) cooperates with at least one second heat exchanger (32), the fluid of which flowing through the at least one second heat exchanger (32) absorbs and dissipates the heat energy generated during compression of the air.

7. The system according to claim 6, characterized in that the at least one second heat exchanger (32) is connected to the evaporation apparatus (62) via a second heat line (36) in order to supply the heat energy generated during compression to the evaporation apparatus (62).

8. The system according to claim 1, characterized in that the evaporation apparatus (62) is connected to the at least one third heat exchanger (64) via the first heat line (68) and/or the second heat line (36) and uses the remaining heat energy of the fluid exiting the evaporation apparatus (62) to set the temperature of the compressed air via the at least one third heat exchanger (64).

9. The system according to claim 1, characterized in that the at least one third heat exchanger (64) is designed as an air-water heat exchanger.

10. The system according to claim 1, characterized in that the at least one third heat exchanger (64) is connected to the at least one first heat exchanger (94, 96) via the first heat line (68) and forms a first fluid circuit (98).

11. The system according to claim 1, characterized in that a compressed air buffer tank (66) is provided in the discharging component (20) of the liquid air energy storage and power plant apparatus (12).

12. The system according to claim 1, characterized in that the at least one third heat exchanger (64) is connected upstream of the compressed air buffer tank (66).

13. A method of operating a system (10) according to claim 1, wherein the thermal energy of the waste heat of the apparatus (14) for permanent water electrolysis is used to supply it to an evaporation apparatus (62) of a discharging component (20) of the liquid air energy storage and power plant apparatus (12) for the conversion of liquefied air into gaseous compressed air; and the thermal energy is constantly supplied to the evaporation apparatus (62) of the discharging component (20) via the first heat line (68), and liquefied air is converted into gaseous air in the evaporation apparatus (62) and supplied to a compressed air buffer storage (66).

14. The method according to claim 13, characterized in that the heat energy of the waste heat of an electrolyzer (80) is used by the apparatus (14) for permanent water electrolysis.

15. The method according to claim 13, characterized in that additionally the thermal energy of a compressor (26) is used for compressing supplied air of a charging component (16) of the liquid air energy storage and power plant apparatus (12) in order to supply it to the evaporation apparatus (62) of the discharging component (20) of the liquid air energy storage and power plant apparatus (12) for the conversion of liquefied air into gaseous compressed air.

16. The method according to claim 13, characterized in that the evaporation apparatus (62) of the discharging component (20) of the liquid air energy storage and power plant apparatus (12) is supplied with the thermal energy via a fluid.

17. The method according to claim 16, characterized in that the fluid is supplied to the evaporation apparatus (62) at a temperature of between 40° C. and 90° C.

18. The method according to claim 13, characterized in that the fluid of the first heat line (68) is cooled before it enters the at least one first heat exchanger (94, 96).

19. The method according to claim 13, characterized in that the fluid of a second heat line (36) is cooled before it enters a second heat exchanger (32).

20. The method according to claim 13, characterized in that energy from renewable sources is used for the liquid air energy storage and power plant apparatus (12) and/or the apparatus (14) for permanent water electrolysis.

21. A system (10), comprising:
a liquid air energy storage and power plant apparatus (12), having a charging component (16) comprising a compressor (26) for compressing supplied air and comprising a liquefier (40), which adjoins said compressor and which serves for liquefying the air, a storage component comprising an air storage (18) for storing the liquefied air, and a discharging component (20) comprising an evaporation apparatus (62) for converting liquid air into gaseous compressed air, wherein heat energy is supplied to the evaporation apparatus (62) via a first heat line (68), and comprising an expansion apparatus which serves for expanding the compressed air and which has a turbine (76) and a generator (78) which is connected to the turbine (76);
an apparatus (14) for permanent water electrolysis having at least one first heat exchanger (94, 96), by means of which the heat energy generated during the electrolysis is absorbed by a fluid flowing through the first heat exchanger (94, 96), which first heat exchanger (94, 96) is connected to the first heat line (68) in such a way that the heat energy generated during the electrolysis is dissipated via the first heat exchanger (94, 96) by means of the fluid and is fed to the evaporation apparatus (62); and
at least one third heat exchanger (64) is connected to at least one second heat exchanger (32) via a second heat line (36) and forms a second fluid circuit (38).

22. A method of operating a system (10) according to claim 1, wherein the thermal energy of the waste heat of the apparatus (14) for permanent water electrolysis is used to supply it to an evaporation apparatus (62) of a discharging component (20) of the liquid air energy storage and power plant apparatus (12) for the conversion of liquefied air into gaseous compressed air; and
converted into gaseous air in the evaporation apparatus (62) to an expansion device having a turbine (76) with a generator (78) connected thereto, in order to drive the turbine (76) and the generator (78) thereby and to supply power generated by the generator (78) to an existing power grid (22).

* * * * *